(12) United States Patent
So et al.

(10) Patent No.: US 8,218,600 B2
(45) Date of Patent: Jul. 10, 2012

(54) FREQUENCY HOPPING NETWORK WITH A GUARANTEED HANDOFF DELAY

(75) Inventors: Hoi-Sheung Wilson So, Sunnyvale, CA (US); Raghuveer Chereddy, Fremont, CA (US); Raymond Rui-Feng Liao, Pleasanton, CA (US)

(73) Assignee: Siemens Aktiengesellschaft, München (DE)

( * ) Notice: Subject to any disclaimer, the term of this patent is extended or adjusted under 35 U.S.C. 154(b) by 873 days.

(21) Appl. No.: 12/338,782

(22) Filed: Dec. 18, 2008

(65) Prior Publication Data

US 2010/0046585 A1     Feb. 25, 2010

Related U.S. Application Data

(60) Provisional application No. 61/091,302, filed on Aug. 22, 2008.

(51) Int. Cl.
*H04B 1/713* (2006.01)
(52) U.S. Cl. ..................................... 375/132
(58) Field of Classification Search ........... 375/132–137
See application file for complete search history.

(56) References Cited

U.S. PATENT DOCUMENTS

| 5,381,443 | A | 1/1995 | Borth et al. |
| 5,448,569 | A | 9/1995 | Huang et al. |
| 5,509,027 | A | 4/1996 | Vook et al. |
| 6,882,677 | B2 | 4/2005 | Dehner et al. |
| 7,379,447 | B2 | 5/2008 | Dunagan et al. |

OTHER PUBLICATIONS

Hoi-Sheung Wilson So et al., "McMAC: A Parallel Rendezvous Multi-Channel MAC Protocol", Wireless Communications and Networking Conference, 2007.WCNC 2007. IEEE, Volume, Issue, Mar. 11-15, 2007, http://robotics.eecs.berkeley.edu/~wlr/Papers/McMAC.pdf, 5pgs.

*Primary Examiner* — Kevin Kim
(74) *Attorney, Agent, or Firm* — Donald B. Paschburg (57) ABSTRACT

A system and method for operating a communications system network, the method including operating an access point (AP) acting as a network controller in a frequency hopping network, the AP communicating with other communication devices of the network over m number of frequencies using a hopping sequence of at least some of the m number of frequencies and a dwell time d for the plurality of frequencies; and operating a communication device seeking to establish synchronized communication with other communication devices of the frequency hopping network without any cross-AP coordination, the communication device scanning all of the m number of frequencies using a scanning time s for each of the m number of frequencies; and, wherein the scanning time s is no greater than 1/m of the AP dwell time d.

21 Claims, 5 Drawing Sheets

FREQUENCY HOPPING NETWORK WITH A GUARANTEED HANDOFF DELAY

CROSS-REFERENCE TO RELATED APPLICATIONS

This application claims the benefit of U.S. Provisional Application No. 61/091,302, filed Aug. 22, 2008, entitled "A Discovery And Handoff Method in Frequency Hopping Networks With a Guaranteed Handoff Delay", the disclosure of which is incorporated by reference herein.

BACKGROUND

1. Field

The embodiments described below relate to, in general, a communication system. More particularly, some embodiments concern frequency hopping communication systems that provide a mechanism for a communication device to dynamically adapt its hopping sequence and timing within a deterministic period of time to communicate with communication devices in a network of communication devices.

2. Description

A number of current wireless communication systems, including for example, Bluetooth, and WLAN, provide the ability for a network of associated communication devices to communicate with each other over a range of frequencies. The communication devices of the system may generally be categorized as one of an access point (AP) and a client. The AP generally acts, to an extent, as a network controller for the wireless network. The clients may be mobile devices or fixed devices that are equipped to communicate with the APs. In a frequency hopping communication system, each communication device includes a transceiver that changes frequencies in synchrony with the other communication devices of the network such that their communication takes place over a common sequence of different frequencies over time. The common sequence of frequencies visited by the sending and receiving communication devices is referred to as the frequency hopping sequence or the hopping sequence.

Some existing frequency hopping (FH) networks may generally be classified as either synchronized or unsynchronized. In synchronized FH networks, the hopping information (i.e., the sequence of frequencies and when to change frequencies) of a cell is known by the AP (and sometimes even clients) of a neighboring cell. In unsynchronized FH networks however, such hopping information is not necessarily known outside of a particular cell. In existing systems, the handoff of mobile clients (i.e., communication devices) in a synchronized FH system has been well-studied and there are two basic methods for achieving a fast handoff in synchronized FH networks. The first method involves the AP of each cell collecting information regarding the hopping sequence and timing of neighboring cells. Each client can then learn from its current AP the hopping information of neighboring cells. As a result, as it roams towards a new AP in a neighboring cell the client can precisely know which frequency to use and when to contact the new AP. According to the second method, the hopping sequence of neighboring access points (APs) is coordinated such that it is possible for a client to infer the hopping information of neighboring APs by knowing the identity of its current AP. As a result, there is no need for an AP to explicitly tell its clients the hopping information of neighboring APs.

For unsynchronized FH networks, the APs of different cells do not know the hopping information regarding the hopping sequences and timing of each other. In such existing cases, one of two approaches is generally used to achieve fast handoffs for roaming clients. In the first method, the hopping sequences of all APs are designed such that they will always include a time slot on one or a few special or control frequencies within any period of time of a particular duration. The exact timing of the special/control time slot need not be known to the client. This method guarantees a client listening on one of such special/control frequencies can find any AP in range, provided that such AP sends out a packet while it is operating during that particular time slot. For the second method, the hopping sequence of each AP is completely unrelated to other APs. Additionally, some APs may not even use the full set of available frequencies. As a result, in general, there is no way to guarantee that a client joining a cell can synchronize with the AP of the new cell in a finite amount of time unless there are some constraints placed on the hopping sequence.

It is noted that there are a number of variations of the different FH networks introduced above. For example, various degrees of synchronization may be used in some networks. Some synchronized FH networks have been classified as either "loosely" or "tightly" synchronized systems depending on the accuracy of synchronization for the network. Regardless of the classification however, both systems are similar in nature. Also, some FH networks may use passive listening while others may use active probing. With passive listening, each AP periodically sends out packets called beacons so that their presence can be discovered or verified by a client trying to synchronize with the AP. With active probing an AP does not necessarily send out beacon packets when there are no data to transmit. Instead, clients trying to discover an AP send out soliciting messages called probe packets to solicit information from APs. When an AP receives a probe packet, it responds with a reply packet to announce its presence to the probing client.

It is noted however that existing frequency hopping schemes have a number of disadvantages. For example, synchronized FH systems, regardless of the degree of synchrony required, are more complex and difficult to implement than unsynchronized FH systems because APs therein must inform other APs or clients of other APs of their current hopping sequence and timing. In some cases, the hopping sequences of APs change continuously over time, thereby making it impossible for those APs to keep other APs or clients continuously up-to-date with their hopping sequence. Also, not all APs may have a reliable communication link with other APs to facilitate fast and/or reliable updates.

While unsynchronized FH systems may be easier to implement than synchronized FH systems since each AP can choose their own hopping sequence independently of each other, unless certain restrictions are placed on the choice of hopping sequences or the hop timing, one cannot guarantee that a handoff can be completed in a fixed amount of time. For example, if an AP does not use a particular frequency due to a high level of interference on that particular frequency, then a client listening on that frequency will never discover the AP regardless of how long the client listens.

SUMMARY

To address at least the foregoing, some embodiments provide a system, method, apparatus, and means including a method that includes operating an access point (AP) acting as a network controller in a frequency hopping network, the AP communicating with other communication devices of the network over m number of frequencies using a hopping sequence of at least some of the m number of frequencies and a dwell time d for the plurality of frequencies, and operating a communication device seeking to establish synchronized communication with other communication devices of the frequency hopping network without any cross-AP coordination, the communication device scanning all of the m number of frequencies using a scanning time s for each of the m number of frequencies, wherein the scanning time s is no greater than 1/m of the AP dwell time d.

In some embodiments, guaranteed synchronized communication between the AP and the communication device can be established within a deterministic amount of time based on a consideration of a total number of the plurality frequencies used by the AP, a maximum time required for the AP and the communication device to switch between any of the plurality of frequencies, a maximum time interval between probe and beacon packets, the dwell time d of the AP, and the scanning time s of the communication device. Operating the AP using the dwell time d and the scanning time s, enables the communication device to establish an initial synchronized communication with the AP within a deterministic period of time less than or equal to 2×d.

In some embodiments, the scanning time for the communication devices (e.g., a client device) is set to s=2 min(b,p)+2w and the dwell time for the AP is set to d=s×m+w. Alternatively, it will be shown that the scanning time for the communication devices (e.g., a client device) may be set to s=min(b,p)+w and the dwell time for the AP may be set to d=s×(m+1). In various embodiments, AP beaconing, client probing, and a combination of the two may be used in a communication protocol herein.

In further aspects, some embodiments herein include operating an AP using the determined dwell time d and operating a communication device (i.e., client) using the determined scanning time s to establish synchronized communication between the AP and the communication device using the hopping sequence of the AP. Using the determined dwell time and the determined scanning time in embodiments of a frequency hopping network as disclosed herein provides a mechanism for a client to scan for new APs during handoff and further allows different APs to choose their own frequency hopping sequence and hopping times independently of each other. Accordingly, a mechanism is provided that guarantees a client seeking a new AP (e.g., roaming client) can find any new AP in communication range within a deterministic amount of time that does not exceed two times the dwell time of the AP (i.e., 2×d).

BRIEF DESCRIPTION OF THE DRAWINGS

The construction and usage of embodiments will become readily apparent from consideration of the following specification as illustrated in the accompanying drawings, in which like reference numerals designate like parts, and wherein.

DETAILED DESCRIPTION OF SPECIFIC EMBODIMENTS

The following description is provided to enable any person in the art to make and use the described embodiments and sets forth the best mode contemplated by for carrying out some embodiments. Various modifications, however, will remain readily apparent to those in the art.

Figure 1:
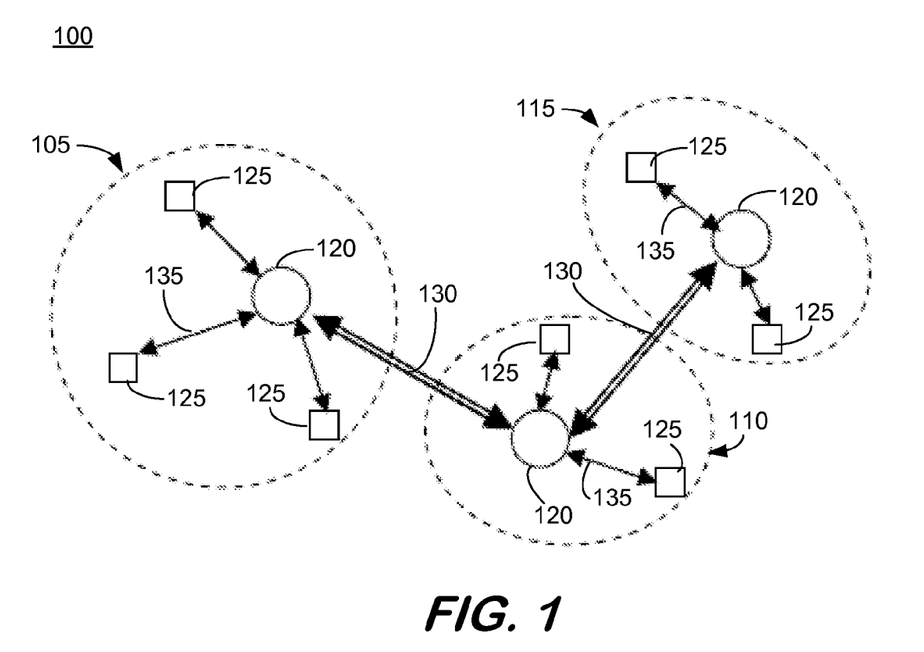
FIG. 1 is an illustration of a frequency hopping communication network, according to some embodiments herein.

Referring to FIG. 1, a network 100 of a wireless communication system is shown. Network 100 comprises two types of communication devices, access points (APs) 120 and client devices 125. APs 120 and clients 125 may comprise any configuration of hardware and software suitable for implementing the methods and processes described herein. Additionally, APs 120 and communication devices 125 may be implemented, at least partially, to operate under the control of and in accordance with program code or instructions relating to the methods described herein and embodied on any tangible medium capable of storing such program code or instructions.

Each AP 120 communicates with clients 125 associated therewith over communication links 135. Each AP and its associated clients are referred to as a cell. Note that only one communication link 135 per cell is labeled in the figure for ease of visualization. Each cell may correspond to a geographic coverage area for the APs therein. Network 100 includes a number of cells, including cells 105, 110, and 115. Each of the cells 105, 110, and 115 includes an AP 120 and a number of associated communication devices (e.g., clients 125) in communication with the AP. In some embodiments, communication link 135 is a wireless link. APs 120 may communicate with each other, in some embodiments, using wired or wireless links 130.

In accordance with some embodiments herein, communication between APs 120 and clients 125 is bi-directional. APs 120 and clients 125 may therefore transmit and receive communication information or data to and from each other. In some embodiments, communication devices implemented as APs 120 and clients 125 may have a transceiver capable of transmitting and receiving communication data.

Figure 2:
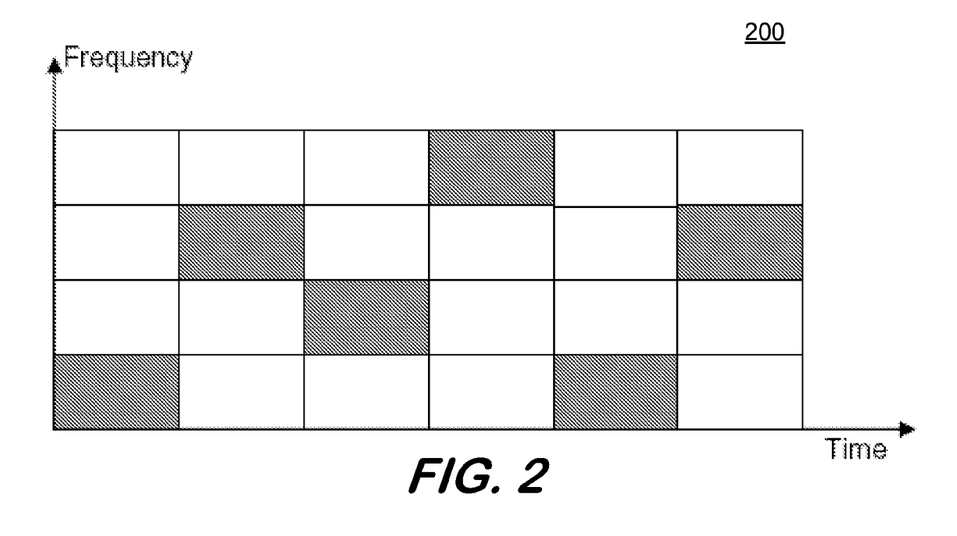
FIG. 2 is a graphical representation of a frequency hopping sequence, according to some embodiments.

In some embodiments, APs 120 and clients 125 may communicate over a plurality of frequencies over a period of time according to a frequency hopping sequence. FIG. 2 provides an illustrative depiction of a hopping sequence of an AP in accordance with some embodiments herein. As shown, the particular communication frequency used by the AP (indicated as a shaded area) varies as a function of time.

In a frequency hopping (FH) environment, APs 120 and clients 125 must be synchronized to operate on the same frequency at the same time in order to communicate with each other. In some embodiments, each AP 120 communicates with clients 125 in its cell using a hopping sequence of the AP. In some embodiments, the AP is also referred to as a network controller since it may control the frequency hopping sequence of its associated cell. Cells 105, 110, and 115 may each operate using a frequency hopping sequence different from each other, in order to, for example, eliminate or reduce interference between cells operating in close proximity with each other. In some embodiments, APs 120 may determine or select their hopping frequency independently of each other.

A respective client 125 may not be fixed to a particular cell and, in fact, may be mobile or have the ability to roam. As a client 125 moves out of one cell and into another cell or otherwise seeks to establish communication with a new AP (e.g., upon powering up), the client 125 needs to establish communication with the new AP and operate on the same frequencies with the same timing prescribed by the frequency hopping sequence of the new AP. For example, as a client 125 moves from cell 105 operating according to the frequency hopping sequence of the AP therein to a new AP in cell 110, the client needs to discover and establish communication with the new AP of cell 110 using the frequency hopping sequence of the new AP in cell 110 in order to communicate with the new AP. In some embodiments, a mechanism for an efficient handoff method to discover and establish communication with an AP is provided by various aspects and embodiments herein.

According to some embodiments, the present disclosure provides calculating the dwell time of the AP and the scanning time of a roaming client on each frequency based on the number of available frequencies, frequency switching time limitation, and a beaconing/probing interval. Using the methods herein, the APs are free to choose their own hopping sequence and hopping times, and yet a roaming client is guaranteed to be able to discover a new AP within a deterministic period of time.

Before fully discussing a handoff method(s) in detail, a number of parameters will first be discussed and briefly explained as they relate to various embodiments herein. According to embodiments herein, a value m is equal the number of available frequencies that AP can use in its hopping sequence;

a value w is equal to the time needed to switch frequency by an AP or a client;

a value d is equal to the dwell time of APs;

a value s is equal the scanning time of a client, that is, the dwell time of the client on each frequency scanned during handoff including the frequency switching time w;

a value b is a maximum time interval that can pass between two (2) beacons sent by the AP on the same frequency if beaconing is used; and a value p is the maximum time interval that can pass between two (2) probes sent by the client on the same frequency if probing is used.

In some embodiments, beaconing and probing at the same interval achieves the same effect and the same handoff discovery delay. The only difference is that in beaconing, the client discovers the AP first, while in probing, the AP discovers the client first. In either manner, the communication that has discovered the other will send a packet immediately to announce its presence. Accordingly, both the client and the AP will discover each other immediately. Therefore, the probing interval p and the beaconing interval b may be viewed as equivalent parameters.

According to one embodiment, a handoff method includes determining the dwell time d of APs and the scan time s of roaming clients such that a handoff delay can be guaranteed to be less than 2 times the dwell time d of the AP.

In some embodiments herein, APs determine, select, or otherwise choose an initial hopping sequence comprising a plurality of frequencies. There may be a total of m available frequencies for use by the AP. However, the AP may choose, in some embodiments, to hop over fewer than the total m frequencies and instead use a subset of the total available frequencies.

In some embodiments, the AP dwells, stays, or operates on each frequency specified in the frequency hopping sequence for a duration of time d before hopping to another (i.e., next) frequency of the frequency hopping sequence. In some embodiments, different APs 120 may use different dwell times. For sake of clarity of the disclosure and not as a limiting factor, the present disclosure will assume a common dwell time d in the following discussion and examples. It is noted that since switching from one frequency to another frequency takes a finite amount of time during which the AP cannot transmit or receive, the dwell time should be much larger than a frequency switching time w. However, it is further noted that if the dwell time is too long, then a network cell may unnecessarily stay on an impaired frequency for a long time, thereby preventing communication on the cell. As an example, modern radio transceiver can typically switch frequencies in less than 5 ms. Therefore, an adequate or good choice of dwell time d for a network with such APs can be about 64 ms or 128 ms.

In some embodiments, the timing of when different APs may change frequencies need not be related to each other. Accordingly, an AP may choose any hopping pattern, using one or more of the m frequencies. As an example of the operating flexibility of an AP, the AP may use only 1 frequency at all times or the AP may use all of the m frequencies in a cyclic or random fashion.

Depending on the communication protocol use by a network, the network may use active beaconing. Per an active beaconing protocol, the AP must periodically send out a "beacon" frame every once in a while to allow any new client to discover the AP. The beacon frame can contain the hopping information (i.e., hopping time boundary and the hopping sequence) of the AP. In some instances, the hopping information may be piggy-backed onto existing data frames that the particular AP transmits.

When a new client desires to join a cell (whether just powering up, as a result of roaming into a coverage area of the new AP, or losing communication with an AP), the client may send an association request frame to the new AP. When the AP receives the association request frame, the AP remembers the new client and optionally responds with an Association Request packet.

The process of the AP periodically transmitting beacon packets, the client(s) sending association request frames, and the AP receiving the association request frame repeats until the time for the current dwell time slot has elapsed. When the dwell time for the AP to stay on the current frequency is up, the AP will change to the next frequency of the hop as specified in its hopping sequence.

In some embodiments, an AP 120 herein may, at any time, adapt its frequency hopping sequence. For example, a new hopping sequence will be advertised in the AP's beacon packets. To avoid a scenario wherein the hopping sequence is changed just before the sequence is about to take effect, the AP may give clients sufficient advance notice (e.g., at least 2 dwell time durations) prior to changing the frequency hopping sequence in the hopping information elements embedded in beacon or data packets.

Figure 3:
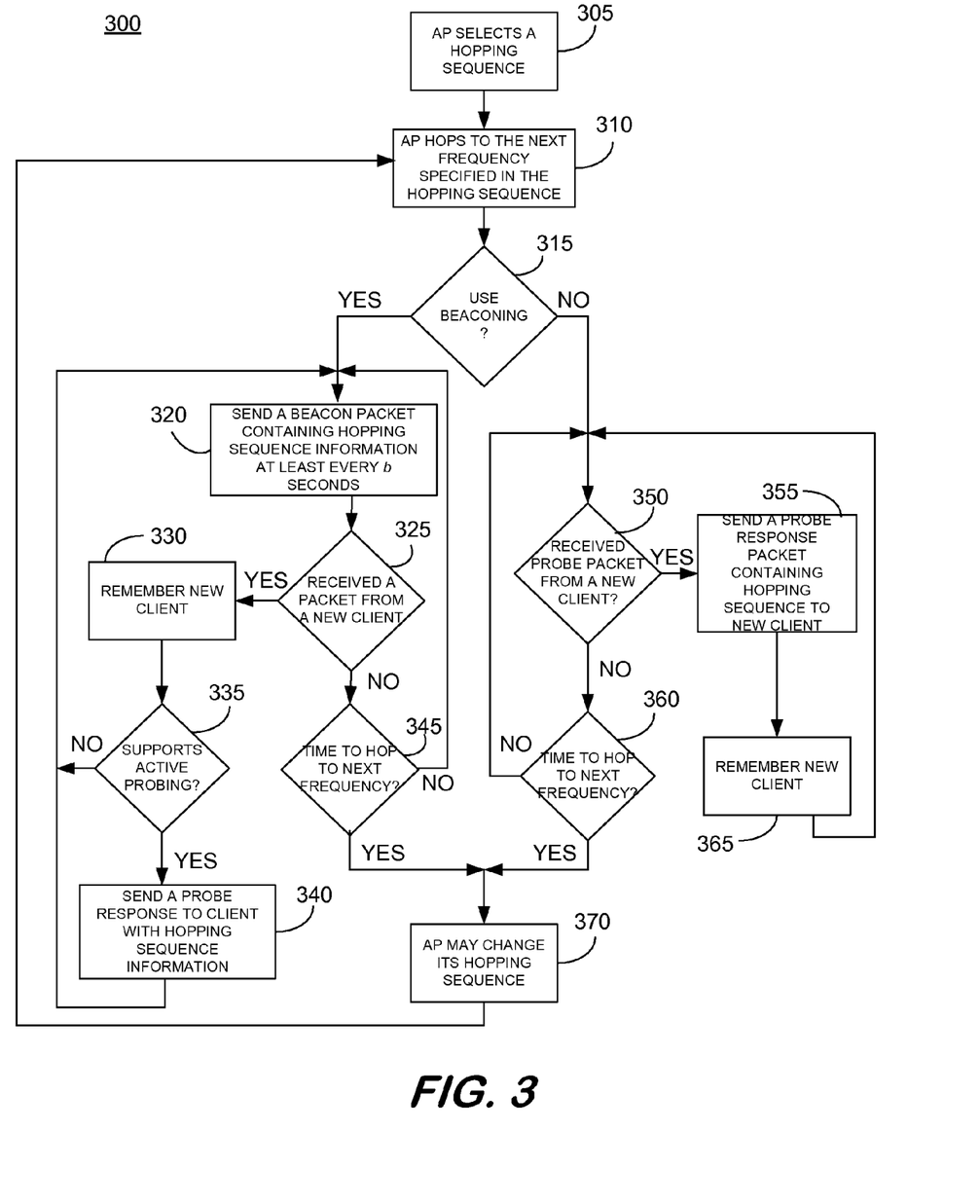
FIG. 3 is a flow diagram illustrating one embodiment of a method for operating an AP, in accordance with some embodiments herein.

To further illustrate the operation of an AP according to some aspects herein, FIG. 3 illustrates a method of operating an AP. As shown, process 300 includes a first operation 305 where the AP selects a frequency hopping sequence. At operation 310, the AP hops to a next frequency specified in the AP's frequency hopping sequence. At operation 315, a determination is made whether beaconing is to be used by the AP. If the AP uses beaconing then process 300 proceeds to operation 320. Otherwise, process 300 proceeds to operation 350.

In the instance the AP uses beaconing and method 300 is at operation 320, the AP transmits a beacon packet containing frequency hopping sequence information at least once every b seconds. While b may be measured in seconds here, different units of measure may be used. At operation 325, a determination is made whether a packet (e.g., an association request frame) is received from a new client by the AP. If a packet is not received from a new client, then the AP determines whether it is time for the AP to hop or switch to the next frequency in the hopping sequence at operation 345. If it is time for the next hop, then the AP may change its hopping sequence at operation 370. If it is not time for the next hop, then the AP returns to a point before operation 320.

If it is determined that the AP did receive a packet from a new client then the AP remembers the client at operation 330. From operation 330, the process proceeds to operation 335 where it is determined whether the new client supports active probing. If the AP supports active probing then a probe response is sent to the client with frequency hopping sequence information and the process proceeds to a point before operation 320. If the AP does not support active probing, then the process proceeds directly to the point before operation 320.

Returning to operation 315 where the determination is made whether beaconing is to be used by the AP, it is seen that process 300 advances to operation 350 where a determination is made whether the AP receives a probe packet from a new client. If the AP receives a probe packet from the new client then the AP sends a probe response packet containing the hopping information to the new client at 355 and the new client is remembered at operation 365. If no probe packet is received by the AP at operation 350, the AP proceeds to check whether it is time for the AP to hop to the next frequency in the frequency hopping sequence. If it is time for the next hop, then the AP may change its hopping sequence at operation 370. If it is not time for the next hop, then the AP returns to a point before operation 350.

Thus, it is seen that process 300 illustrates an operation of an AP according to one embodiment herein that covers instances of the AP using beaconing and the communication with clients that may or may not support probing.

Figure 4:
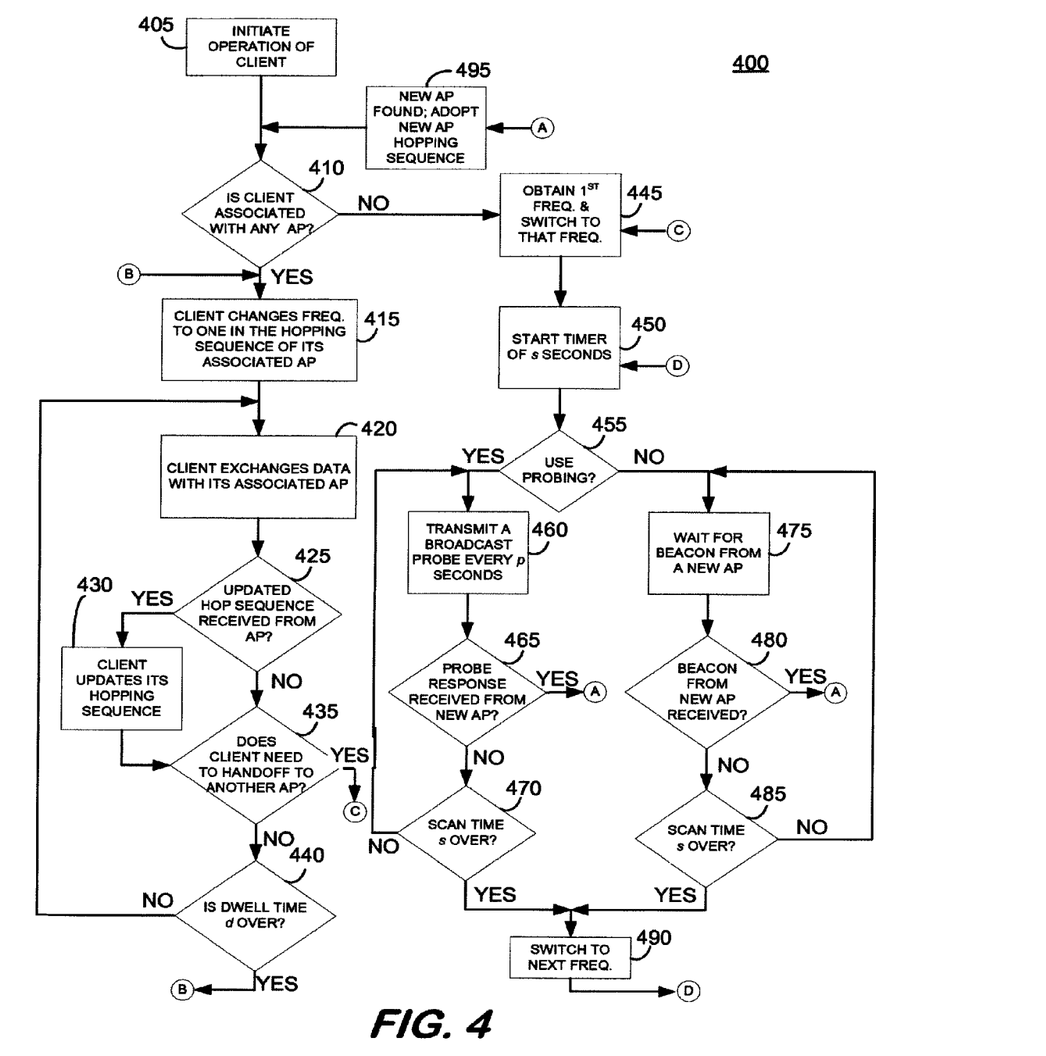
FIG. 4 is a flow diagram illustrating one embodiment of a method for operating a client communication device, in accordance with some embodiments herein.

The details of a client operation during a bootstrap and a handoff process are depicted in FIG. 4 that illustrates operation of a client during, for example, a bootstrap and a handoff scenario. In some embodiments, each client may be associated with an AP and hops synchronously with the AP while in the cell covered by the AP, in order to communicate with the AP. Further, in some embodiments, as a client physically moves from one cell to another, the client may detect a drop in signal quality from the AP and/or the client may observe an increase in the loss of packets from its AP. Consequently, the client may choose to abandon the frequency hopping sequence of the current AP in search of an AP with a better signal. In an attempt to locate and establish communication with a new AP, the client may sequentially scan each of the available m frequencies for a short period of time, as will be described later herein. Further according to some embodiments, if a packet from the new AP is received by the client, the client can use the hopping pattern and hop time boundary information stored in the received packet to synchronize its own hopping to that of the newly discovered AP.

Prior to discussion an operation of a client as depicted in FIG. 4, it is noted that there may be three possible ways for the client to receive a packet from a new AP. In various communication protocols a client may receive a packet from an AP using (1) beaconing, (2) probing, and (3) beaconing and probing. Using beaconing, an AP periodically sends out one frame at least every b seconds, excluding the time when it is switching frequencies (i.e., hopping). These frames (i.e., beacon frames) may contain information about the hopping sequence and the hop times of the AP. In some embodiments, the beacon frames need not be sent precisely periodically so as long as there is not an idle period of time longer than the b seconds that the AP does not send any packet. In a communication protocol using beaconing, clients may listen for such beacon frames as the client scans the different frequencies during handoff.

In an instance of probing, a roaming client transmits probe packets during the handoff process at least once every time duration of p on all of the frequencies it scans, excluding the time needed for frequency switching. When an AP receives a probe packet from a new client, the AP responds with a probe response. A probe response frame may contain information about the hopping sequence and the hop times of the AP. According to some embodiments, a probe packet may be sent immediately following a frequency switch. It is noted that the client does not need to send probe packets perfectly periodically so long as there is no interval or gap of more than p.

In an instance of a beaconing and probing communication protocol, an AP sends out beacon frames periodically similar to a beaconing method while a roaming client sends out probe packets similar to a probing method. Consequently, the client listens for both beacon packets and probe response packets.

Referring to FIG. 4, a process 400 for operating a client according to one embodiment is depicted. At operation 405, operation of the client is initiated. At operation 410, a determination is made regarding whether the client is currently associated with any AP. If the client is associated with an AP, then process 400 proceeds to operation 415, else process 400 proceeds to operation 445.

In the instance process 400 arrives at operation 415, the client changes frequency to one in the hopping sequence of its associated AP. The client then proceeds to exchange data with its associated AP at operation 420. At operation 425, a determination is made whether an updated frequency hopping sequence is received from the AP. If an updated frequency hopping sequence is received from the AP, then the client updates its frequency hopping sequence, as illustrated at operation 430 and proceeds to operation 435 where a determination is made whether the client needs to handoff to another AP. If it is determined that the client does not need to handoff to another AP, then process 400 proceeds to operation 440. However, if it is determined at operation 435 that the client needs handoff to another AP, then process 400 proceeds to operation 445. If the dwell time d is over as determined at operation 440, then process 400 returns to a point before operation 415. If the dwell time d has not elapsed at operation 440, then method 400 returns to a point just before operation 420.

In the instance process 400 arrives at operation 445 from operation 410 or operation 435, the client obtains a first frequency and switches to that frequency at operation 445. Proceeding to operation 450, a scan time timer to measure the dwell time s the client stays on each frequency is started. At operation 455, a determination is made whether the client transmits probing packets. If the client uses probing then the method proceeds to operation 460. At operation 460, the client transmits a probe packet every p seconds. At the next operation 465, a determination is made regarding whether the client has received a probe response from an AP. If a probe response is received from an AP, then the process proceeds to point A at operation 495. If a probe response is not received from an AP, then the process proceeds to operation 470 wherein a determination of whether the scan time s is over is performed. If the scan time s has elapsed, then the client proceeds to switch to a next frequency in the frequency hopping sequence at 490, otherwise the operation of the client returns to a point before operation 460.

If the client does not use probing as determined at operation 455, then the method proceeds to operation 475 to wait for a beacon from a new AP. At operation 480, a determination is made regarding whether the client has received a beacon from a new AP. If a beacon is received from a new AP, then the process proceeds to point A at operation 495. If a beacon response is not received from a new AP, then the process proceeds to operation 485 wherein a determination of whether the scan time s is over. If the scan time s has elapsed, then the client proceeds to switch to a next frequency in the frequency hopping sequence at 490, otherwise the operation of the client returns to a point before operation 475. From operation 490, the process 400 continues to operation 450 after switching to the next frequency to scan.

Thus, it is seen that process 400 illustrates an operation of a client communication device according to one embodiment herein that covers instances of the client roaming from one AP to another, the client communicating with an AP for a first time, the client using or not using probing.

Figure 5:
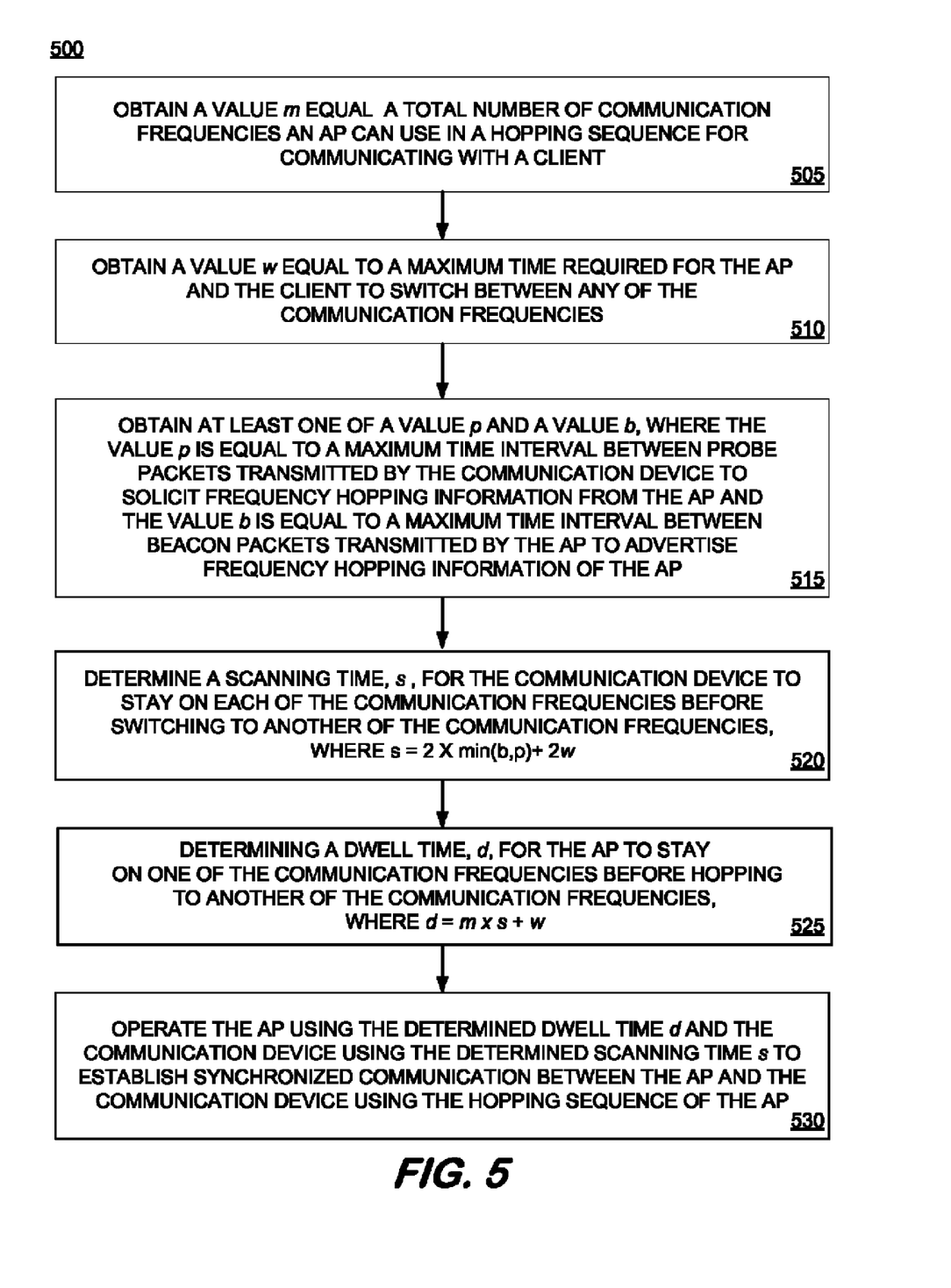
FIG. 5 is a flow diagram illustrating one embodiment of a method, in accordance with some embodiments herein.

FIG. 5 provides an illustrative method 500 relating to a handoff process. At operation 505, a value m is set, determined, or otherwise obtained that is equal to a total number of available frequencies an AP can use in a hopping sequence for communicating with a client. In some aspects, transceiver hardware and regulation requirements may have a determining impact on the value m.

At operation 510, a value w is set, determined, or otherwise obtained that is equal to the frequency switch time that corresponds to a maximum time needed by the hardware and/or software of both AP and client to change frequencies. While a larger s may also work, a larger value for s will result in an unnecessary waste of time.

At operation 515, the beaconing interval, b, and/or the probing interval, p, is set, determined, or otherwise obtained. Whether the beaconing interval b and/or the probing interval p is obtained may be based on the communication protocol used by the AP and clients.

If beaconing is used, b may be set such that a fraction of time spent sending beacons is lower than a certain overhead threshold (e.g., 10%) according to application requirements. For example, if each beacon frame takes 1 ms to send, and the beaconing interval is 10 ms, then the fraction of time spent sending beacons may be set to 1 ms/10 ms or 10%.

In an instance probing is used, the probing interval may be set such that the fraction of time spent sending probe packets is lower than a certain overhead threshold (e.g., 10%) according to application requirements. For example, if each probe packet takes 1 ms to send, and the probe packet interval is 10 ms, then the fraction of time spent sending probe packet is 1 ms/10 ms or 10%.

In some instances both beaconing and probing are used. In such embodiments, both b and p may be set, determined, or otherwise obtained as mentioned above.

Further, s and d may be set, determined, or otherwise obtained based on and with the consideration of the parameters m, w, and b if beaconing is used, and/or p if probing is used. For example, in an instance beaconing is used:

$$s=2b+2w \text{ and } d=s \times m+w; \text{ or}$$

$$s=b+w \text{ and } d=s \times (m+1).$$

In an instance probing is used:

$$s=2p+2w \text{ and } d=s \times m+w; \text{ or}$$

$$s=p+w \text{ and } d=s \times (m+1).$$

In the instance that both beaconing and probing are used:

$$s=2 \times \min(b,p)+2w \text{ and } d=s \times m+w; \text{ or}$$

$$s=\min(b,p)+w \text{ and set } d=s \times (m+1).$$

FIG. 5, at operations 520 and 525, discloses determining the dwell time d of the AP and the scanning time s of the client. The dwell time d of the AP and the scanning time s of client may be determined in accordance with the equations listed hereinabove.

Operation 530 of process 500 includes operating the AP using the determined dwell time d and operating the communication device (i.e., client) using the determined scanning time s to establish synchronized communication between the AP and the communication device using the hopping sequence of the AP. Using the determined dwell time and the determined scanning time in embodiments of a FH network as disclosed herein provides a mechanism, for example, for a roaming client to scan for new APs during handoff and further allows different APs to choose their own frequency hopping sequence and hopping times independently of each other. By choosing the dwell time d for the APs and the scanning time s for clients in a manner disclosed herein, a mechanism is provided that guarantees a client seeking a new AP (e.g., roaming client) can find any new AP in communication range within a deterministic amount of time that does not exceed two times the dwell time of the AP (i.e., 2×d).

Figure 6:
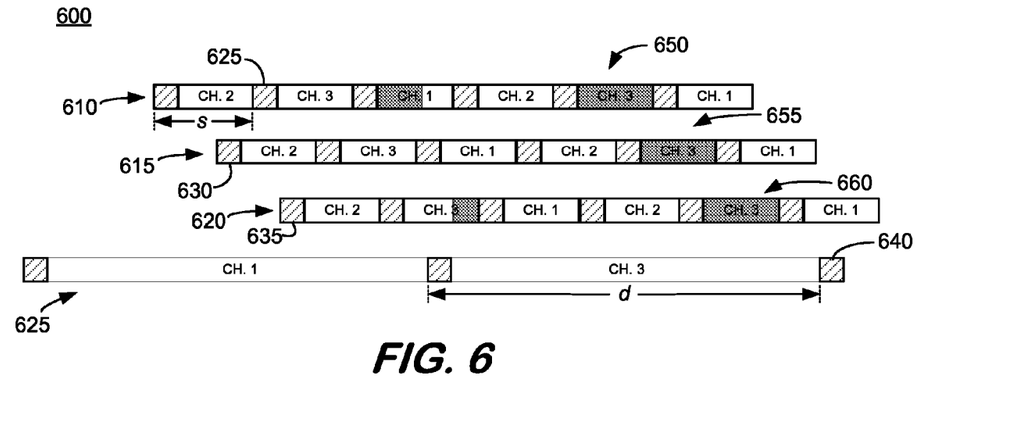
FIG. 6 is a timing diagram depicting communication transmissions over a plurality of frequencies for a number of clients and a beaconing AP, in accordance with some embodiments herein.

FIG. 6 is provides a timing diagram 600 of a plurality of client communication devices operating within range of an AP. FIG. 6 illustrates that regardless of the time offsets of the AP and different roaming clients 610, 615, and 620 each of the roaming client is guaranteed to discover the new AP in no more than 2 times the AP dwell time d (i.e., 2×d). In particular, timing diagram 600 illustrates the timing of three clients 610, 615, and 620 scanning the three available frequencies using a scanning time s on each of the three frequencies and the timing aspects of an AP 625 operating on some of the frequencies scanned by the clients 610, 615, and 620 for a dwell time of d. As indicated by the shaded areas that indicate the time where the AP and the client are operating on the same frequency at the same time (e.g., 650, 655, and 660), it is clear that each of the clients 610, 615, and 620 discovers the AP within a period of time no more than 2 times the AP dwell time d (i.e., 2×d).

With reference to FIG. 6, an example illustrating how a client discovers a new AP will be discussed. For this example, the AP uses beaconing, a total of three (3) frequencies are available (i.e., m=3), the switching time w for the clients and the AP is 4 ms, and the beaconing interval b of AP is 16 ms. In accordance with methods herein, the scan time s is set to be 2b+2w which equals 40 ms and dwell time of AP is set to be s×m+w which equals 40×3+4=124 ms. By setting the dwell time d to be m times larger than s plus the switching time w, it is guaranteed that for each dwell time of the AP, a new client will be on the same frequency as the AP for at least some duration of b. Given the AP sends out a beacon packet at least once every interval of b at the minimum, the client will be assured to discover the AP.

It is noted that alternatively the scan time s may be set to be b+w=20 ms and d may be set to be s×(m+1)=80 ms, in accordance with methods disclosed herein. Here too, each of the clients 610, 615, and 620 will be guaranteed to discover the AP within a period of time no more than 2 times the AP dwell time d (i.e., 2×d).

Figure 7:
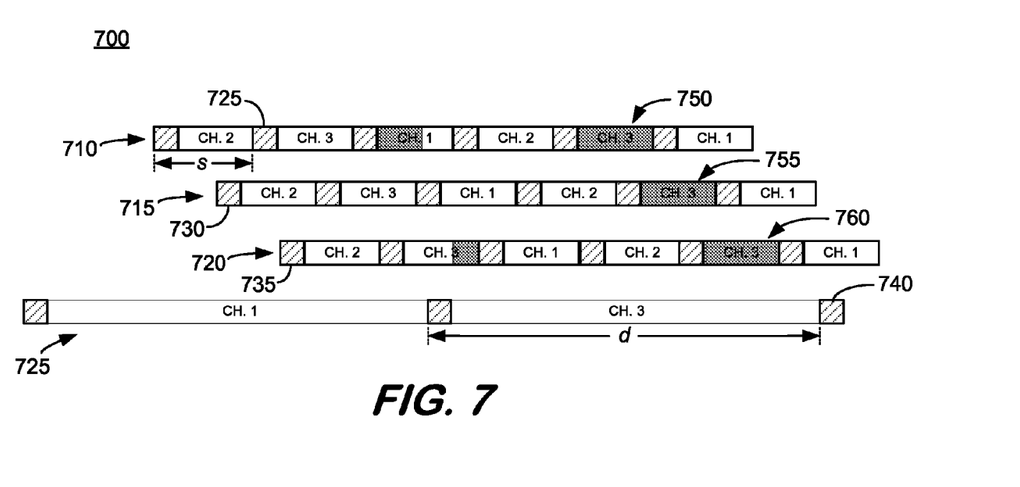
FIG. 7 is a timing diagram depicting communication transmissions over a plurality of frequencies for a number of probing clients and an AP, in accordance with some embodiments herein.

FIG. 7 illustrates that regardless of the time offsets of the AP and different roaming clients, each of the roaming clients is guaranteed to discover the new AP in no more than 2 times the AP dwell time d (i.e., 2×d), where probing is used by the clients. For this example, the client uses probing, a total of three (3) frequencies are available (i.e., m=3), the switching time w for the clients and the AP is 4 ms, and the probing interval p of the clients is 26 ms. In accordance with methods herein, the scan time s is set to be p+w which equals 26 ms+4 ms=30 ms and dwell time of AP is set to be s×(m+1) which equals 30 ms×(3+1)=120 ms. As shown by the shaded areas that indicate the time where the AP and the client are operating on the same frequency at the same time (e.g., 750, 755, and 760), it is clear that each of the clients 710, 715, and 720 discovers the AP within a period of time no more than 2 times the AP dwell time d (i.e., 2×d).

Thus, it is seen that the client scanning sequence is guaranteed to overlap with that of the AP for at least a period of s−w or 30 ms−4 ms=26 ms. Furthermore, according to one embodiment, the present disclosure guarantees that there is at least a contiguous period of 26 ms that neither the AP nor the client is switching frequencies. Therefore, given that probes or beacons are sent at least once every 26 ms, the client will discover the new AP.

It is noted that the methods disclosed herein will also work if the client sends out probes more frequently than once every 26 ms, according to other embodiments. Alternatively, the AP can send beacons every 26 ms (or less), and the client can use passive listening to achieve the same effect as active probing, in accordance to still other embodiments.

It is noted that alternatively the scan time s may be set to be 2p+2w=2(26 ms)+2(4 ms)=60 ms and d may be set to be s×m+w=60 ms×3+4 ms=184 ms, in accordance with methods disclosed herein. Here too, each of the clients 710, 715, and 720 will be guaranteed to discover the AP within a period of time no more than 2 times the AP dwell time d (i.e., 2×d).

The following description is provided to enable any person in the art to make and use the described embodiments and sets forth the best mode contemplated by for carrying out some embodiments. Various modifications, however, will remain readily apparent to those in the art.

What is claimed is:

1. A method for operating a communications network, the method comprising:
    operating an access point (AP) acting as a network controller in a frequency hopping network, the AP communicating with other communication devices of the network over m number of frequencies using a hopping sequence of at least some of the m number of frequencies and a dwell time d for the plurality of frequencies; and
    operating a communication device seeking to establish synchronized communication with other communication devices of the frequency hopping network without any cross-AP coordination, the communication device scanning all of the m number of frequencies using a scanning time s for each of the m number of frequencies, wherein the scanning time s is no greater than 1/m of the AP dwell time d and, wherein guaranteed synchronized communication between the AP and the communication device can be established within a deterministic amount of time based on a consideration of a total number of the plurality frequencies used by the AP, a maximum time required for the AP and the communication device to switch between any of the plurality of frequencies, a maximum time interval between probe and beacon packets, the dwell time d of the AP, and the scanning time s of the communication device.

2. The method of claim 1, wherein:
    the maximum time required for the AP and the communication device to switch between any of the communication frequencies is represented by w;
    the maximum time interval between probe and beacon packets is represented by p and b, where p is equal to a maximum time interval between probe packets transmitted by the communication device to solicit frequency hopping information from the AP and b is equal to a maximum time interval between beacon packets transmitted by the AP to advertise frequency hopping information of the AP;
    the dwell time d of the AP is the amount of time the AP stays on one of the plurality of frequencies before hopping to another of the plurality of frequencies, where d=m×s+w; and
    the scanning time s of the communication device is the amount of time the communication device stays on each of the plurality of frequencies before switching to another of the plurality of frequencies, where s=2×min (b, p)+2w.

3. The method of claim 2, wherein the communication device can establish the guaranteed synchronized communication with the AP within a deterministic period of time less than or equal to 2×d.

4. A method for operating a communications network, the method comprising:
    operating an access point (AP) acting as a network controller in a frequency hopping network, the AP communicating with other communication devices of the network over m number of frequencies using a hopping sequence of at least some of the m number of frequencies and a dwell time d for the plurality of frequencies; and
    operating a communication device seeking to establish synchronized communication with other communication devices of the frequency hopping network without any cross-AP coordination, the communication device scanning all of the m number of frequencies using a scanning time s for each of the m number of frequencies, wherein the scanning time s is no greater than 1/m of the AP dwell time d and, wherein the scanning time of the communication device includes a switching time for the communication device to switch between the plurality of frequencies.

5. The method of claim 2, wherein the AP alternatively operates with the AP using the dwell time d, where d=s×(m+ 1); and the communication device alternatively operates to establish communication with the AP using the scanning time s, where s=min(b, p)+w.

6. The method of claim 4, wherein the communication device sequentially scans each of the plurality of frequencies.

7. A method for operating a communications network, the method comprising:
    operating an access point (AP) acting as a network controller in a frequency hopping network, the AP communicating with other communication devices of the network over m number of frequencies using a hopping sequence of at least some of the m number of frequencies and a dwell time d for the plurality of frequencies; and
    operating a communication device seeking to establish synchronized communication with other communication devices of the frequency hopping network without any cross-AP coordination, the communication device scanning all of them number of frequencies using a scanning time s for each of the m number of frequencies, wherein the scanning time s is no greater than 1/m of the AP dwell time d and, wherein the hopping sequence of the AP and timing boundaries of the hopping sequence are determined independently of the operation of the communication device.

8. The method of claim 7, wherein a hopping sequence of the AP may include fewer than all of the plurality of frequencies.

9. The method of claim 7, further comprising a plurality of access point (APs) and a plurality of communication devices.

10. The method of claim 9, wherein the hopping sequence of each of the plurality APs and timing boundaries of the hopping sequence of each of the plurality APs are determined independently of each other.

11. The method of claim 2, wherein both a value p and a value b are obtained based on a type of communication protocol used by the AP and the communication device.

12. The method of claim 2, wherein the hopping information comprises the hopping sequence and hopping timing boundary information of the AP.

13. The method of claim 4, wherein the communication network is an ad-hoc network wherein every communication device is an AP which periodically beacons.

14. A frequency hopping communications system, comprising:
an access point (AP) acting as a network controller in the frequency hopping communications system, the AP communicating with other communication devices of the network over m number of frequencies using a hopping sequence of at least some of the m number of frequencies and a dwell time d for the plurality of frequencies; and
a communication device seeking to establish synchronized communication with other communication devices of the frequency hopping system without any cross-AP coordination, the communication device scanning all of the m number of frequencies using a scanning time s for each of the m number of frequencies, wherein the scanning time s is no greater than 1/m of the AP dwell time d and, wherein the hopping sequence of the AP and timing boundaries of the hopping sequence are determined independently of the operation of the communication device.

15. The system of claim 14 wherein a hopping sequence of the AP may include fewer than all of the plurality of frequencies.

16. A frequency hopping communications system, comprising:
an access point (AP) acting as a network controller in the frequency hopping communications system, the AP communicating with other communication devices of the network over m number of frequencies using a hopping sequence of at least some of the m number of frequencies and a dwell time d for the plurality of frequencies; and a communication device seeking to establish synchronized communication with other communication devices of the frequency hopping system without any cross-AP coordination, the communication device scanning all of the m number of frequencies using a scanning time s for each of the m number of frequencies, wherein the scanning time s is no greater than 1/m of the AP dwell time d and, wherein guaranteed synchronized communication between the AP and the communication device can be established within a deterministic amount of time based on a consideration of a total number of the plurality frequencies used by the AP, a maximum time required for the AP and the communication device to switch between any of the plurality of frequencies, a maximum time interval between probe and beacon packets, the dwell time d of the AP, and the scanning time s of the communication device.

17. The system of claim 16, wherein:
the maximum time required for the AP and the communication device to switch between any of the communication frequencies is represented by w;
the maximum time interval between probe and beacon packets is represented by p and b, where p is equal to a maximum time interval between probe packets transmitted by the communication device to solicit frequency hopping information from the AP and b is equal to a maximum time interval between beacon packets transmitted by the AP to advertise frequency hopping information of the AP;
the dwell time d of the AP is the amount of time the AP stays on one of the plurality of frequencies before hopping to another of the plurality of frequencies, where $d = m \times s + w$; and
the scanning time s of the communication device is the amount of time the communication device stays on each of the plurality of frequencies before switching to another of the plurality of frequencies, where $s = 2 \times \min(b, p) + 2w$.

18. The system of claim 17, wherein the communication device can establish the guaranteed synchronized communication with the AP within a deterministic period of time less than or equal to $2 \times d$.

19. The system of claim 17, wherein the AP alternatively operates with the AP using the dwell time d, where $d = s \times (m+1)$; and the communication device alternatively, operates to establish communication with the AP using the scanning time s, where $s = \min(b, p) + w$.

20. The system of claim 17, wherein both a value p and a value b are obtained based on a type of communication protocol used by the AP and the communication device.

21. The system of claim 17, wherein the hopping information comprises the hopping sequence and hopping timing boundary information of the AP.

* * * * *